(No Model.)  M. H. HOLCOMB.  2 Sheets—Sheet 1.
BAKING DISH.

No. 414,413.  Patented Nov. 5, 1889.

WITNESSES:
Chas. Lurcott
C. Sedgwick

INVENTOR
M. H. Holcomb
BY Munn & Co.
ATTORNEY (No Model.) 2 Sheets—Sheet 2.

M. H. HOLCOMB.
BAKING DISH.

No. 414,413. Patented Nov. 5, 1889.

WITNESSES:
Chas. Lurcott
C. Sedgwick

INVENTOR
M. H. Holcomb
BY Munn & Co.
ATTORNEY

UNITED STATES PATENT OFFICE.

MARY H. HOLCOMB, OF FARGO, DAKOTA TERRITORY.

BAKING-DISH.

SPECIFICATION forming part of Letters Patent No. 414,413, dated November 5, 1889.

Application filed May 14, 1889. Serial No. 310,698. (No model.)

*To all whom it may concern:*

Be it known that I, MARY H. HOLCOMB, of Fargo, in the county of Cass and Territory of Dakota, have invented a new and Improved Baking-Dish, of which the following is a full, clear, and exact description.

The ordinary form of baking-dish is highly unsatisfactory for many reasons, one of the principal reasons being that the dish is unsightly when placed upon the table. It is to overcome these difficulties and to provide a dish which shall be so arranged as to add to the appearance of the table that I have designed the baking-dish forming the subject-matter of this application.

My invention consists, essentially, of a receptacle and an ornamental rim or cover provided with drapery, which may be connected to the dish, all as will be hereinafter more fully described, and specifically pointed out in the claims.

Reference is to be had to the accompanying drawings, forming a part of this specification, in which similar figures and letters of reference indicate corresponding parts in all the views.

Figure 1:
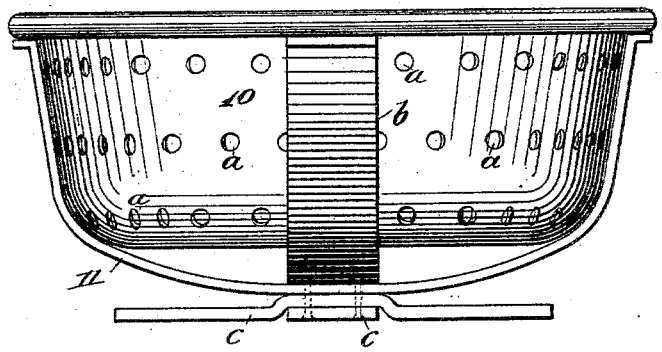
Figure 2:
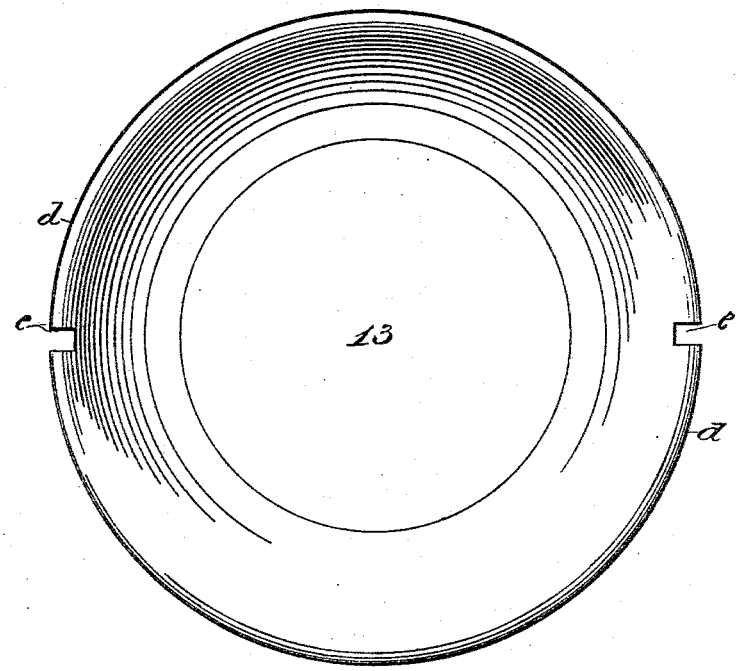
Figure 3:
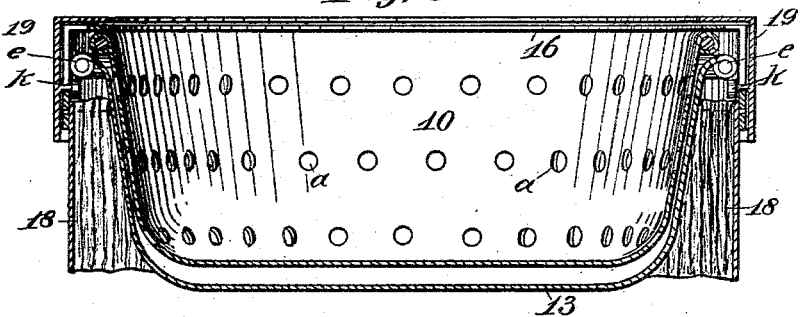
Figure 4:
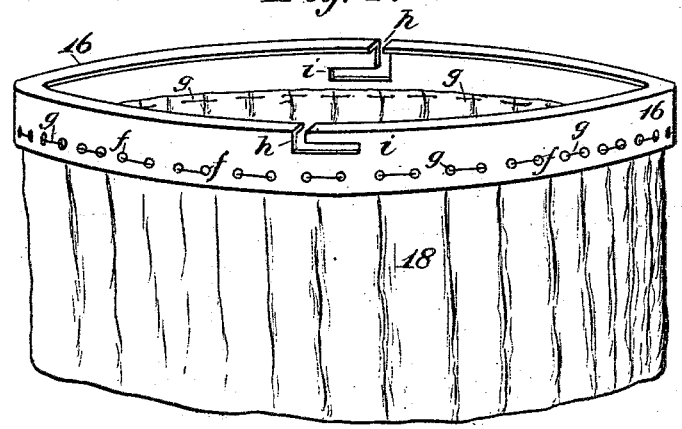
Figure 5:
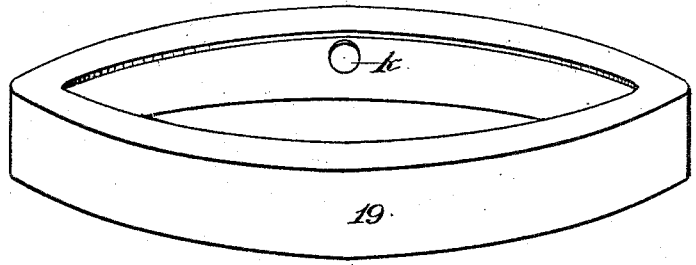
Figure 6:
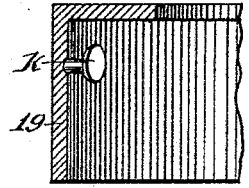

Figure 1 is a side view of my improved baking-dish, representing the same as it appears when ready for the oven. Fig. 2 is a plan view of the receiving-dish, into which the baking-dish is placed when it is to be served. Fig. 3 is a cross-sectional view of the dish, representing it in connection with the parts with which it is arranged when served. Fig. 4 is a perspective view of the drapery-supporting rim. Fig. 5 is a perspective view of the outer rim, and Fig. 6 is an enlarged cross-sectional view of a portion of the outer rim.

In the drawings, 10 represents a vessel, preferably formed from pressed tin, through the walls of which vessel there are formed a number of perforations $a$. When pies, puddings, patties, or other dishes are to be cooked in the receptacle 10, it is supported by a standard 11, made up of arms $b$, to which there are riveted cross-bars $c$, the arms being arranged to fit beneath the flanges of the receptacle 10, as shown in Fig. 1.

When it is desired to serve the dish cooked in the receptacle 10, I provide a receptacle or outer dish 13 of the same form as the dish or receptacle 10, the two dishes or receptacles being adjusted, as represented in Fig. 3. In the rim $d$ of the dish or receptacle 13 I form two slots $e$, (see Fig. 2,) for a purpose to be hereinafter set forth.

In connection with the dishes or receptacles 10 and 13, I employ a metallic ring 16, which is formed with a series of perforations $f$, through which there are passed stitches $g$, which support a curtain or drapery of any kind—such as the one shown at 18—this drapery being made from paper or any proper textile fabric. In the ring 16, I form vertical slots $h$, which communicate with laterally-extending slots $i$, said slots $i$ extending in opposite directions, as shown in Fig. 4, and in order that a finish may be given to the upper edge of the apparatus I provide an outer ring 19, that is preferably silver-plated, and this ring I provide with studs $k$, which are so placed as to enter the slots $h$, and then by turning one or the other of the rings 16 or 19 the studs may be caused to enter the slots $i$, in which position the rims will be locked to place. On the upper edge of the ring 19 is formed an inwardly-extending horizontal flange $19^a$, and, if desired, the ring 16 may have a similar flange $16^a$. The two rings associated as above described are then brought into engagement with the dish or receptacle 13, the studs $k$ being passed downward through the slots $e$ of the rim $d$, when a slight turn will carry the studs beneath the rim, so that by grasping the ring 19 the dish or receptacle 13 and the receptacle 10 carried thereby may be moved and placed upon the table, said dishes being held between the studs $k$ and the horizontal flange.

The apparatus above described presents an extremely elegant appearance when a handsome drapery is selected.

Having thus described my invention, I claim as new and desire to secure by Letters Patent—

1. The combination, with a receptacle formed with a slotted rim, of an ornamental ring having a top flange arranged to fit above the dish or receptacle and provided with studs arranged to pass through the slots in the rim and engage the dish or receptacle rim, substantially as described.

2. The combination, with a dish or receptacle formed with a slotted rim, of an inner ring formed with angular slots or recesses, a drapery connected to the inner ring, and an outer ring provided with studs arranged to engage the recesses of the inner ring and to engage the slotted rim of the dish or receptacle, substantially as described.

3. The combination, with a dish or receptacle having a slotted rim, of a perforated vessel arranged to rest therein, rings 16 and 19, the ring 16 being formed with angular slots and the ring 19 being provided with studs and a top flange, and a drapery or curtain carried by the ring 16, all parts being arranged substantially as described.

4. The combination, with an inner ring having drapery attached thereto and provided with slots, as described, of an outer ring having a top flange and inwardly-projecting studs adapted to engage the slots of the inner ring, substantially as and for the purpose described.

MARY H. HOLCOMB.

Witnesses:
E. R. RUSSELL,
CARRIE L. HOLCOMB.